April 29, 1969      R. R. GUNDERSON      3,441,336
ADHESIVE REFLECTOR UNIT WITH FLEXIBLE BACKING
Filed Nov. 17, 1966      Sheet 1 of 2
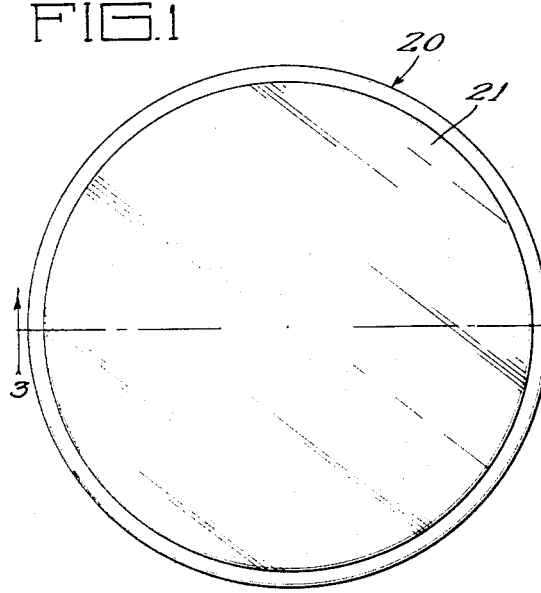
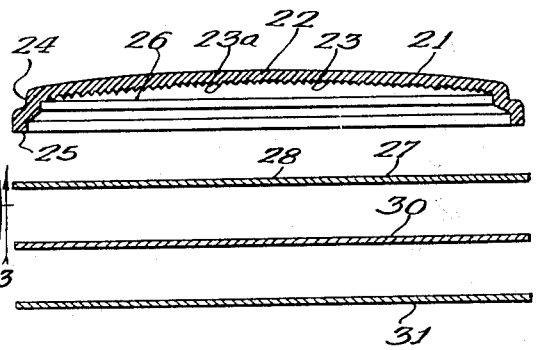
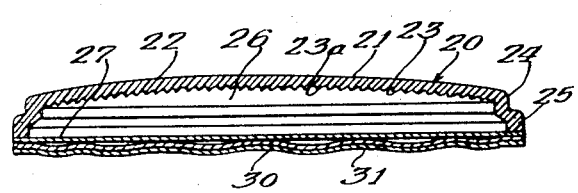
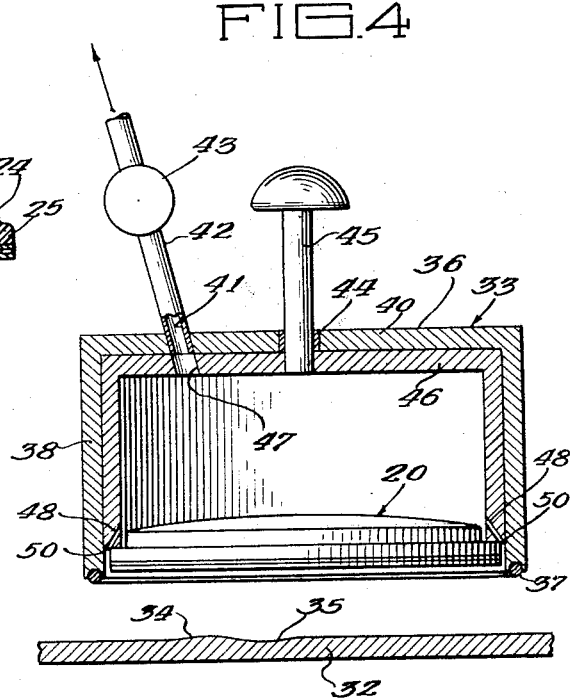
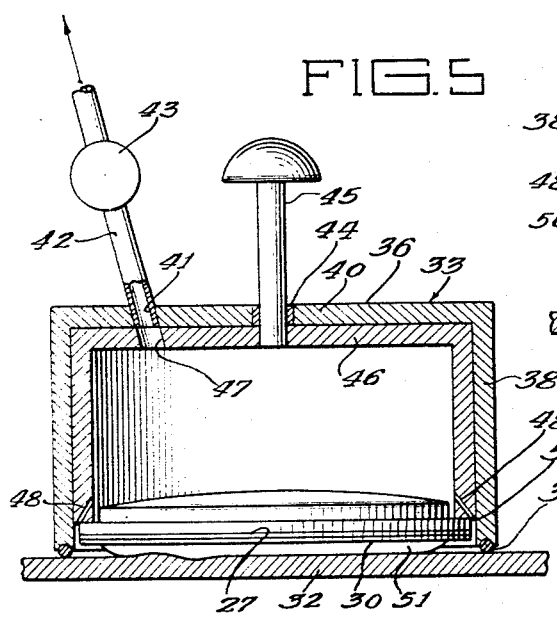
Inventor:
Ralph R. Gunderson
By: Hofgren, Wegner, Allen,
Stellman & McCord
Attorneys

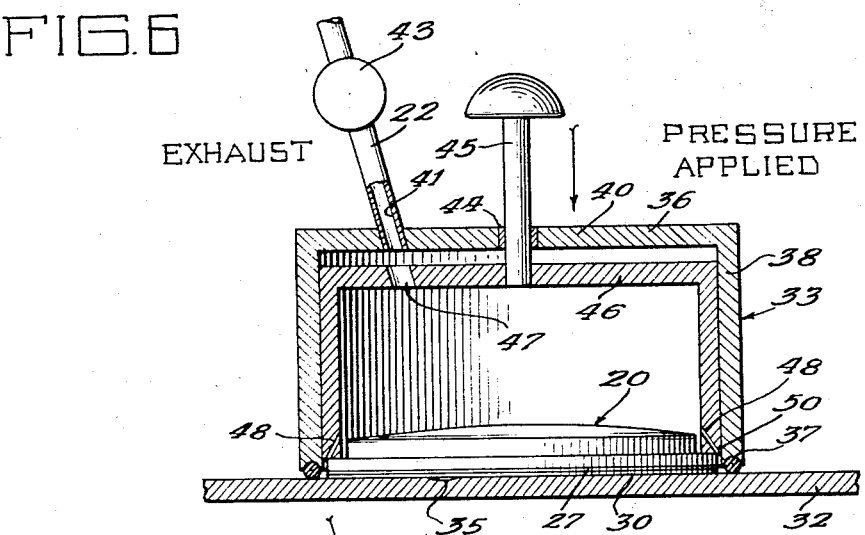
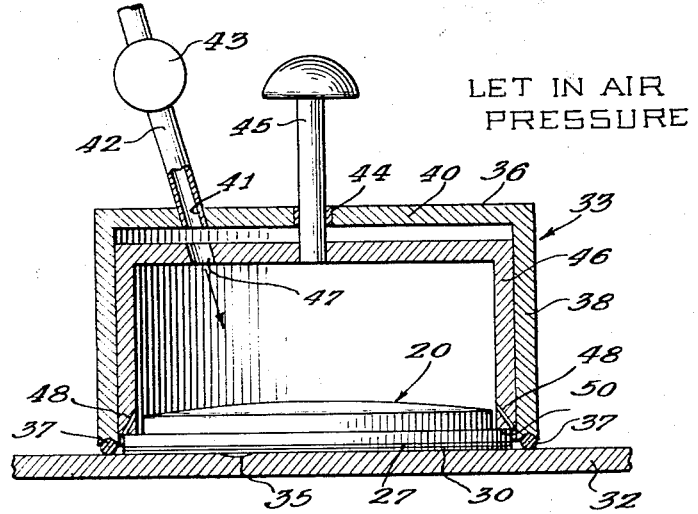
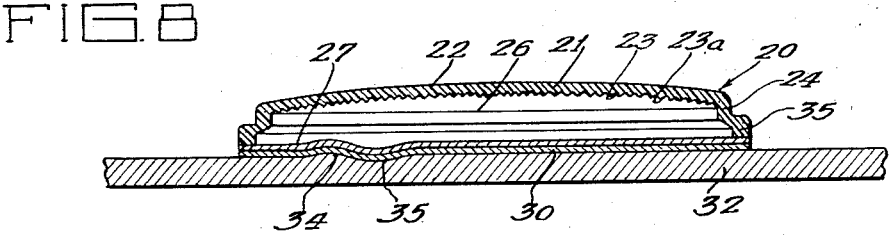

United States Patent Office 3,441,336
Patented Apr. 29, 1969

3,441,336
ADHESIVE REFLECTOR UNIT WITH FLEXIBLE BACKING
Ralph R. Gunderson, 1028 W. 92nd Place, Chicago, Ill. 60620
Continuation-in-part of application Ser. No. 469,436, July 6, 1965. This application Nov. 17, 1966, Ser. No. 616,138
Int. Cl. G02b 17/00
U.S. Cl. 350—67    2 Claims

ABSTRACT OF THE DISCLOSURE

An adhesive reflector unit including a reflector member having a rearwardly opening cavity wi.h a flexible deformable backing member spanning the cavity for confining air pressure therewithin and adhesive means on the exposed face of the backing member responsive to deformation of the backing member by confined air pressure in the inner cavity for adhering the reflector unit to a mounting surface.

---

This invention relates to light reflector units provided with adhesive backings, and to a method for adhering such reflector units to a mounting surface.

This application is a continuation-in-part of my copending application, Ser. No. 469,436, filed July 6, 1965, and entitled, "Adhesive Reflector Unit," now abandoned.

Light reflector units are currently widely used in conjunction with highway vehicles. Heretofore, such reflector units have been mounted within metal or plastic brackets which, in turn, have been secured to a vehicle mounting surface by cap screws or other mechanical means. Such installations have failed to provide hermetic seals so that the reflecting and refracting surfaces of the reflector units become dirty after use; and in addition, the assembly and attachment of the reflector units has been a time-consuming endeavor.

The present invention provides a particularly effective seal for the interior of the reflector unit, and the method of mounting the reflector unit affords an exceedingly high resistance to shearing forces tending to loosen and remove the unit from its mounting surface. In addition, the refletcor units can be effectively and securely mounted on surfaces of limited area where it would be difficult or impossible to mount reflectors of the prior art.

The primary object of the present invention is to provide a novel reflector unit having a flexible backing peripherally secured thereto and adapted for adhesively attaching the reflector unit to a mounting surface without the use of brackets or other mechanical accessories.

Another object is to provide a reflector unit having an inner cavity which is closed by a flexible or deformable membrane hermetically sealed to the reflector with a two-faced adhesive backing applied to the outer surface of the flexible membrane.

A further object is to provide a reflector unit adapted for making secure adhering contact with mounting surfaces having irregular and uneven contour.

Yet another object is to provide a reflector unit which utilizes confined air pressure within the unit to effect adherence to an irregular mounting surface.

The invention is illustrated in a preferred embodiment in the accompanying drawings, in which:

FIGURE 1 is a top plan view of a light reflector unit;
FIGURE 2 is an exploded sectional view of a light refletcor unit showing a reflective member, a flexible membrane backing, a two-faced flexible adhesive backing, and a cover for the adhesive backing;
FIGURE 3 is a sectional view of the reflector unit of FIGURE 1 showing the reflector and the membrane and adhesive backings in assembled relation with central portions of the two backings partially adhered to each other;
FIGURES 4 through 8 illustrate diagramamtically the preferred method by which the reflector unit is adhered to a mounting surface;
FIGURE 4 being a sectional view of a tool for applying the reflector unit and illustrating the reflector unit being held against a movable plunger within the evacuated chamber of the tool;
FIGURE 5 being a view similar to FIGURE 4 illustrating the tool pushed against a mounting surface so that internal pressure within the cavity within the reflector unit pushes outwardly upon the membrane backing and adhesive backing of the reflector unit to press the two backings firmly together in their central portions and to press the central portion of the exposed adhesive backing firmly against the mounting surface;
FIGURE 6 being a view similar to FIGURE 5 with the central chamber of the tool still exhausted and showing the application of a force to the movable plunger within the chamber to apply pressure against the peripheral rim of the reflector unit forcing the outer marginal areas of the adhesive backing against the mounting surface;
FIGURE 7 being a view similar to FIGURE 6 illustrating the release of the vacuum within the inner chamber of the tool permitting air pressure to rush in to the evacuated chamber and against the exposed face of the reflector unit; and
FIGURE 8 is a sectional side elevation view showing the reflector unit of FIGURE 7 adhered to a mounting surface with the membrane backing and adhesive backing intimately secured to each other in all opposed portions and with the adhesive backing firmly adhered to all portions of the mounting surface, whether the portions are concave, convex or flat.

In the embodiment illustrated and referring particularly to FIGURES 1 through 3, a light reflector unit, generally deisgnated 20, is shown. The reflector unit 20 preferably includes an integral reflective member 21 formed from a light-transmitting synthetic plastic. The material generally used is methyl methacrylate commonly sold under the trade name "Lucite." A reflective member 21 includes a light-receiving face 22 and a reverse or rear face 23 containing a plurality of refracting and reflecting prismatic surfaces 23a for receiving incoming light causing said light to be redirected generally along its incoming path. The reflective member 21 may be securely formed, and it is preferably provided with a rearwardly extending annular wall 24 terminating in a peripheral rim or lip 25, which wall 24 and rim 25 afford an inner cavity 26 for the reflective member 21.

As shown in FIG. 2, a pair of backing members are preferably provided for securement to the reflective member 21 to confine a volume of air pressure within the cavity 26 of the reflective member 21. The innermost of the two backing members is preferably in the form of an annular flexible or deformable membrane or backing 27. The inner face of backing 27 is secured in its peripheral marginal portions to the rim 25 of the reflective member 21 in an air-tight fashion so as to confine a volume of air at or about atmospheric pressure within the cavity during assembly of the reflector unit.

The membrane or backing 27 may be formed of a sheet plastic or durable paper material and is preferably provided with an inner reflecting surface 28 of thin aluminum foil or other high reflective material so that incident light striking the surface 28 provides brightened or "live" portions of the reflective member 21. In the preferred form, the membrane or backing 27 is heat sealed to the annular lip or rim 25 of the reflective member. It is to be understood that the securement of backing 27 to rim 25 is of sufficient strength to maintain the air-tight seal therebetween, even though the difference in air pressure between the interior of the cavity and the exterior of the reflector may approximate 14.7 pounds per square inch.

The outermost backing member is preferably in the form of an annular two-faced adhesive backing 30. The adhesive backing 30 may be formed of a thin plastic or a durable paper sheet material which also is flexible or deformable and is provided with a suitable securing medium such as a pressure sensitive adhesive on each of its opposite faces. Its inner face is adhered continuously in an annular pattern to the peripheral portions of the membrane 27.

The backings 27 and 30 are preferably not adhered across the reflective member 21 with the drum-like tightness; that is, there is some looseness or slack to permit movement of the flexible or deformable backings outwardly of the plane defined by the peripheral rim by the confined air within the cavity responsive to reduction of air pressure about the exterior of the reflector unit, particularly from the exterior of the outer face of the backings 27 and 30. As best shown in FIG. 3, the central portions of the opposed faces of the two flexible backings 27 and 30 may initially be only partially adhered to each other. As will subsequently be explained, the central portions are urged into intimate adhering contact by the aforementioned confined air pressure within the cavity 26 during application of the reflector unit to a mounting surface. The outer face of the adhesive backing 30 prior to use is covered by a protective paper material 31 adhered in place by the pressure-sensitive adhesive on the outer face of the backing 30. The adhesive used on the backing 30 has adhering qualities of such a nature as to permit the reflector unit to be firmly adhered to a mounting surface whether that surface be formed of metal, wood, plastic, leather, or the like. Also, the deformability of flexibility and looseness in the backings 27 and 30 permit the backings to follow the contour of an irregular or uneven surface so that continuous and firm adhering contact is achieved even when the reflector unit 20 is applied to an undulatory surface, without the possibility of rupture of the backings or separation of backing 27 from rim 25 responsive to a reduction in air pressure about the exterior of the reflector.

The unique method of adhering the reflector unit 20 to a mounting surface 32 is diagrammatically illustrated in FIGURES 4 through 8.

In FIGURE 4, the reflector unit 20 is shown being held in position by a vacuum applied to the inner chamber of a tool, generally designated 33, used for adhering the reflector unit 20 to a mounting surface 32. The reflector unit 20 has had the protective cover of paper material 31 removed to expose an outer adhesive face of the two-faced adhesive backing 30. The mounting surface 32 is illustrated as having a high convex area 34 and a low concave area 35 as well as a generally flat area which conditions are commonly encountered on surfaces to which the reflector units are adhered. It is to be understood that mounting surfaces to which reflector units 20 are to be applied may be vastly more undulatory or irregular than that which is shown herein for the purposes of illustration. For example, such reflectors might be applied to relatively rough cast surfaces of a truck frame or body.

Referring to FIGURE 4, the tool 33 may include a vacuum bell or cup-shaped housing 36 which has a resilient peripheral seal 37 protruding from the end of its side wall 38 to make an air-tight seal against the mounting surface 32 when placed thereagainst as indicated in FIGURE 5. The housing 36 is provided with a bottom wall 40 which may be apertured at 41 to accommodate a vacuum hose 42 secured therein and connected to a source of vacuum indicated generally at 43.

The bottom wall 40 may also be provided with a bushing 44 which makes a substantially air-tight sliding fit about a shank 45. The end of the shank 45 is shown herein as secured to a cup-shaped plunger 46 adapted to make a close sliding fit within the side walls 38. The plunger 46 preferably has an opening 47 which permits air to be pulled within the vacuum bell 36 through the vacuum line 42 when it is desired to evacuate the interior of the housing 36. A number of bleeder lines or passages 48 may be formed in an annular lip portion 50 of the plunger 46 for a purpose which will subsequently be made more apparent.

When it is desired to adhere a reflector unit 20 to a mounting surface 32, the cover 31 of the adhesive backing 30 is removed and the unit 20 is placed within the open end of the housing 36, as shown in FIGURE 4, so that the annular rim 25 rests upon the annular lip portion 50 of the plunger 36. The reflector adhering gun or tool 33 is tipped so that the housing opens upwardly, and the reflector unit 20 is simply dropped into place with its rim 25 upon the lip portion 50 which functions as a shoulder or stop to position the reflector unit 20 within the tool 33. The housing 36 is shaped to accommodate the particular shape and size of the reflector unit which is to be adhered.

After the reflector unit 20 is dropped into place against lip portion 50, a vacuum is applied to exhaust air from the interior of the housing 36 and the plunger 46. The evacuation of the housing 36 will cause the ambient air pressure to which the unit 20 is subjected to hold the reflector unit 20 in firm contact against lip portion 50 (see FIG. 4). This is true even though at this time the small bleeder lines 48 are open to atmospheric pressure and are permitting air pressure to enter in small quantities into the evacuated chamber within the housing 36.

In FIGURE 5, the housing 36 has been pressed against a mounting surface 32 so that the annular seal 37 provides an airtight fit against the surface. As the interior of the housing 36 continues to be exhausted under these conditions, the bleeder lines 48 also provided for evacuation of the air pressure from between the adhesive face of the reflector unit 20 and the exhausted face of the mounting surface 32. Because of the great decrease in atmospheric pressure about the exterior of reflector unit 20 within the housing 36, the aforementioned confined air under atmospheric pressure within the cavity 26 of the reflector unit 20 will exert a positive force on all of the most minute portions of the backings 27 and 30, causing the flexible membrane backing member 27 and the flexible adhesive backing member 30 to bellow outwardly to intimiately engage all surface depressions, and to yield inwardly to intimately engage all surface projections, so that the entire central portion of the flexible adhesive backing 30 is urged by the internal air pressure within the cavity 26 of the reflector unit 20 into firm and intimate adhering contact with the mounting surface 32. The strength of the air-tight seal between rim 25 and backing 27 is sufficient to withstand the vast differential in pressure to prevent separation of backing 27 from the rims. In addition, the deformable nature of backings 27 and 30 and their looseness or slackness in central areas permits this intimate engagement to occur without rupture of the backngs or bridging of the surface irregularities.

It can be seen that this outward bellowing of the two flexible backings 27 and 30 causes the outer adhesive face of the adhesive backing 30 to search out and enter into all low spots such as 35 of the mounting surface 31 so that there is a continuous and intimate adhering contact between the mounting surface 32 and the adhesive backing 30 which contact is assured by the positive outward urge of the confined air under atmospheric pressure acting from within the cavity 26. In addition, it will be noted that the flexible membrane backing 27 is also urged to slavishly follow the contour of the mounting surface and to be adhered in all its central portions to the inner face of the two-faced adhesive backing 30. In the practical application of this method with reflector units 20 of approximately three-inch diameter, the interior of the housing 36 is exhausted almost immediately so that the flexible backings 27 and 30 are instantly bellowed outwardly against the mounting surface 32.

In FIGURE 6, the next step of mounting the reflector is illustrated. A force is applied to the handle 53 in the direction of the arrow to drive the shank 45 and the plunger 46 downwardly against the annular rim 25. This movement drives the reflector unit 20 downwardly against the mounting surface 32 to adhere the outer annular portion of the exposed adhesive face to the mounting surface 32 so that the entire backing 30 is adhered. It should be noted that the entire adhering operation is being conducted in a vacuum so that no air pressure is trapped between the outer face of the adhesive backing 30 and the mounting surface 32.

Immediately after pushing the plunger 46 against the annular rim 25, as shown in FIGURE 6, a vacuum line 42 is opened to the ambient air pressure (FIGURE 7). The in-rushing air pressure strikes the front face 22 of the reflector unit 20 to exert an additional force pushing the reflector unit even more firmly against the mounting surface 32. Even though the reflective member 21 may be resiliently deformable, the crown of the front face 22 is not affected because downward deformation of the crown is resiliently opposed by the pressure of the confined air within the cavity 26.

After forcing the reflector unit 20 downwardly with the force of the ambient air pressure (FIGURE 7), the reflector gun or tool may be removed for a subsequent operation. The reflector unit 20 as finally adhered to a mounting surface is shown in FIGURE 8. Reflector units 20 of the type herein described which are adhered by the method of this invention have been shown to have a tremendously effective and continuous adherence between the backing member and the mounting surface. Tests have indicated that such lens units adhered by the present method exhibit even greater adhering qualities than do those units which do not utilize positive confined air pressure within the cavity, to urge the backing into intimate engagement with a mounting surface. For example, the lens or reflector units 20 are approximately one and one-half times more resistant to shearing forces than previously known reflector units.

The foregoing detailed description is given for clearness of understanding only and no unnecessary limitations should be understood therefrom, for some modifications will be obivous to those skilled in the art.

I claim:
1. A light reflector unit for application to a mounting surface, comprising: a reflective member for reflecting light impinging upon the front surface therof, said member having a rearwardly opening cavity and being provided with a peripheral rim; a deformable, flexible backing member having an inner face and an outer face, the inner face being secured to said peripheral rim in an air-tight manner, a volume of air at positive pressure confined in the cavity, the backing member being deformable responsive to exterior pressure reductions below the pressure of said air confined in said cavity outwardly of the plane defined by the peripheral rim by the confined air pressure wtihin the cavity; and pressure sensitive adhesive disposed on the outer face of said backing member for adhering the reflector unit to a mounting surface, the reduction of air pressure outside the reflector unit during adherence of the reflector to the mounting surface causing the confined air pressure within the cavity to urge substantially all portions of the outer face of the deformable flexible backing member against the mounting surface to adhere substantially all portions of the outer face of the backing member to the mounting surface whether the mounting surface is substantially planar or has concave portions therein.

2. A light reflector unit as specified in claim 1 in which the backing member is formed of an inner flexible membrane and an outer flexible membrane disposed in juxtaposition, the inner membrane being secured to the peripheral rim to confine air pressure in the cavity, and pressure sensitive adhesive being disposed between the juxtaposed membranes to adhere adjacent faces of the two flexible membranes together.

References Cited

UNITED STATES PATENTS

| 1,754,964 | 4/1930 | Pancoast | 350—109 |
| 2,175,698 | 10/1939 | Netz | 350—109 X |
| 2,620,289 | 12/1952 | Douglas | 156—286 |
| 2,791,938 | 5/1957 | Doolittle et al. | 350—67 |
| 3,104,274 | 9/1963 | King | 350—299 |
| 3,266,371 | 8/1966 | Gunderson | 350—67 |

FOREIGN PATENTS 519,220    2/1931    Germany.

DAVID SCHONBERG, *Primary Examiner.*

P. R. GILLIAM, *Assistant Examiner.*

U.S. Cl. X.R.

350—97